United States Patent [19]
Nicholson et al.

[11] 3,872,680
[45] Mar. 25, 1975

[54] METHOD AND APPARATUS FOR LAYING PIPELINES

[75] Inventors: William B Nicholson, Metairie; Benjamin C. Tisdale, Jefferson Parish, both of La.

[73] Assignee: Brown & Root, Inc., Houston, Tex.

[22] Filed: Aug. 31, 1973

[21] Appl. No.: 393,298

[52] U.S. Cl. ............................ 61/72.3, 242/86.5 R
[51] Int. Cl. ......................... F16l 1/00, B65h 17/46
[58] Field of Search .................. 61/72.3, 72.1, 72.4; 242/86.5 R

[56] References Cited
UNITED STATES PATENTS
1,602,450  10/1926  Pritchard ...................... 242/86.5 R
3,237,438  3/1966  Tesson ............................ 61/72.3 X

*Primary Examiner*—Jacob Shapiro
*Attorney, Agent, or Firm*—Bargfrede and Thompson

[57] ABSTRACT

A method of and apparatus for laying on the floor of a body of water a pipeline wound on a reel mounted on a movable floating vessel, such as a barge. The reel is rotatably supported on the vessel to enable the pipeline to be unwound from the reel toward the stern of the vessel and into the body of water as the vessel is moved forwardly. Also, the reel assembly is movable along the deck of the vessel so that the reel can be positioned adjacent the stern of the vessel in which position the pipeline can be unwound therefrom and advanced into the body of water in a substantially straight line until it nears the floor of the body of water. The portability of the reel assembly relative to the vessel enables it to be conveniently and suitably positioned on the deck of the vessel so as to prevent excessive deformation of the pipeline when it is laid in shallow or deep water. Straightening rollers are positioned to reverse bend the pipe as it is unspooled from the reel to remove substantially all of the permanent curvature in the pipeline caused by winding on the reel.

6 Claims, 6 Drawing Figures

3,872,680

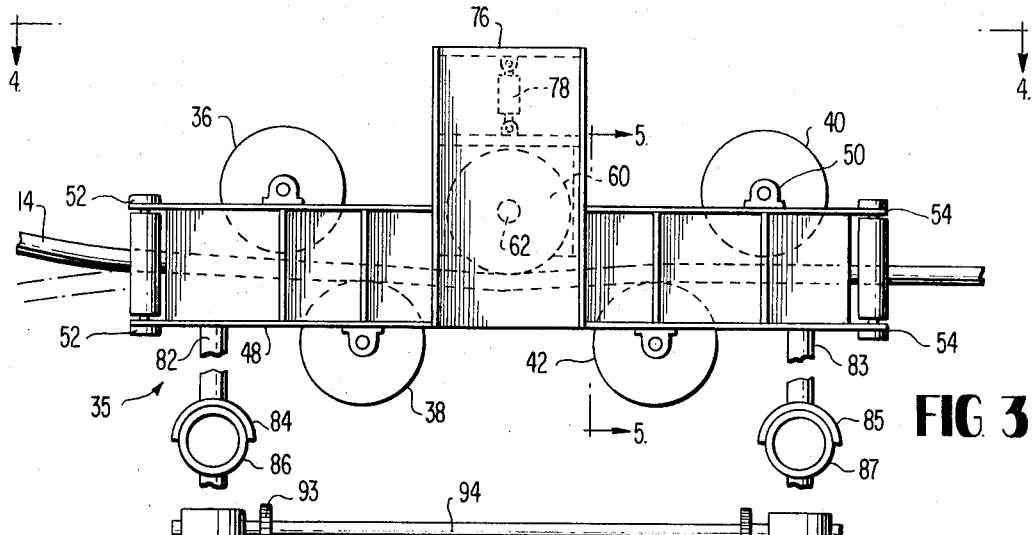
FIG. 3
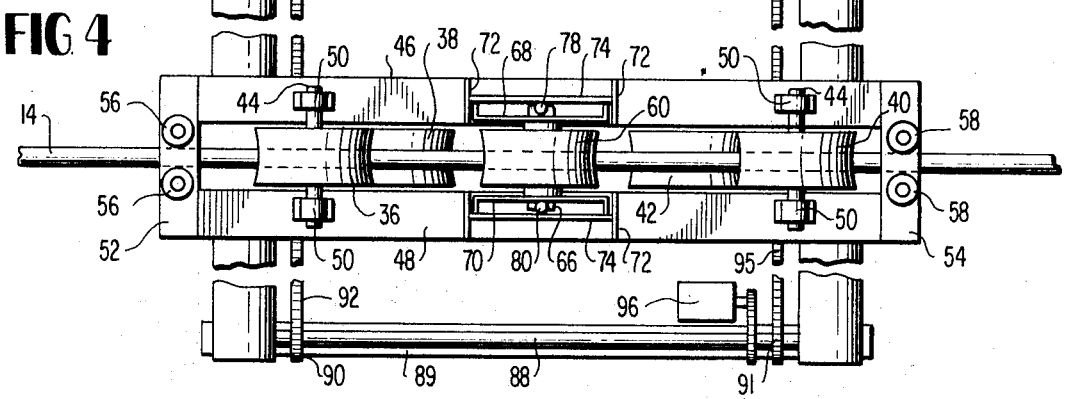
FIG. 4
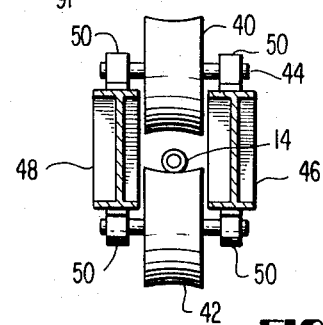
FIG. 5
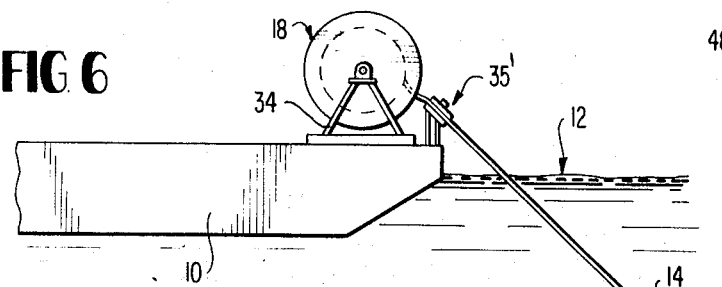
FIG. 6
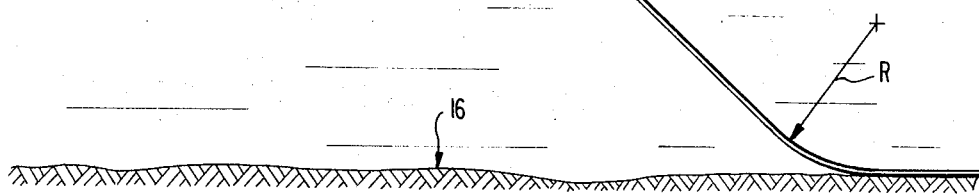

METHOD AND APPARATUS FOR LAYING PIPELINES

BACKGROUND OF THE INVENTION

This invention relates to a method and apparatus for laying a pipeline and, more particularly, to a method and apparatus for laying on the floor of a body of water a pipeline wound on a reel rotatably mounted on a movable floating vessel.

U.S. Pats. Nos. 3,237,438 and 3,372,461 disclose apparatus and methods for laying pipeline which are representative of the apparatus and methods heretofore used for laying on the floor of a body of water a pipeline wound on a reel mounted on a movable floating vessel. In such apparatus and method, a pipeline comprising a plurality of joined pipe sections is wound on a rotatable reel which is fixedly mounted on a floating vessel such as a barge. The vessel is then moved in the desired direction of the pipeline while the pipeline is unwound from the reel and lowered to the bottom of the body of water. As the pipeline leaves the reel, and before it enters the water, it is bent in a direction which is the reverse of that in which it was bent on the reel, in order to straighten the pipe before it is lowered into the water.

In most cases, the reel upon which the pipeline is wound is supported for rotation about a vertical axis on the vessel. Accordingly, the pipe is then straightened by reverse bending the pipe in a horizontal plane as it leaves the reel. Since the reel has several layers of pipe wound thereon, the amount of reverse bend required to straighten the pipe will vary from layer to layer. If the pipe is not reverse bent enough or is reverse bent too much, the pipe will again assume the curvature that will relieve it of stress when it reaches the bottom of the body of water. In such cases, the pipe will tend to curve away from the desired direction of the pipeline, which is highly undesirable.

With presently used apparatus and methods for laying underwater pipelines, there is a maximum depth of water in which a pipeline of a given diameter can be laid. The depth limit is determined by the radius of curvature to which the pipe can be bent before the yield point of the pipe material is exceeded. With conventional equipment, the pipe is moved substantially horizontally along the deck of the vessel towards the water. As the pipe leaves the deck of the vessel, it is usually supported by a curved guide shoe or other similar device, as shown, for example in U.S. Pats. Nos. 3,641,778 and 3,685,306, that is designed to maintain a minimum radius of curvature in the pipeline as it leaves the vessel and enters the water. As the depth of water increases, with a resulting increase in the amount and weight of the pipe in the body of water extending to the floor thereof, the angle between the supported, substantially horizontal pipe on the vessel deck and the unsupported pipe in the water adjacent the surface thereof increases to a point where such guide shoes or similar devices required to prevent excessive bending are impractical or where the yield point of the pipeline material is exceeded so as to effect permanent deformation of the pipeline.

It will be readily seen, therefore, that a need has arisen for an underwater pipeline laying apparatus and method which can be utilized for laying pipeline in shallow or deep water without excessive bending of the pipeline as it enters the water. The apparatus and method of the present invention are not subject to any of the aforementioned disadvantages of the presently used pipeline apparatus, and possess advantages which are not possessed by the previously used apparatus, thereby fulfilling the need which has arisen for such an improved pipeline laying apparatus and method.

SUMMARY OF THE INVENTION

In the method and apparatus of the present invention, the pipeline is unwound from a reel rotatably mounted on a movable floating vessel. The pipeline is advanced toward the stern of the vessel and into the body of water as the vessel is moved forwardly to maintain a predetermined tension in the pipeline. The reel assembly preferably is portable and is movably supported on the deck of the vessel so as to be freely movable between the bow and the stern of the vessel. In this manner, when the pipeline is to be laid in deep water, for example, over 500 ft. in depth, the reel assembly can be moved to a position adjacent the stern of the vessel so that the pipeline can be unwound therefrom and advanced into the body of water in a substantially straight line until it nears the floor of the body of water, thereby preventing any excessive deformation of the pipeline as it enters the water. The term "substantially straight line" is to be interpreted herein as meaning either straight or with minimum curvature as determined by the tension maintained in the pipeline as it is being laid.

A straightening roller assembly is positioned on the deck of the vessel to reverse bend the pipeline as it is unwound from the reel to remove any permanent curvature in the pipeline caused by winding on the reel. Preferably, the reel is mounted on the deck of the vessel for rotation about a substantially horizontal axis, and the straightening rollers are positioned to allow the pipeline to be unwound from either the top or the bottom of the reel. When the pipeline is being laid in deep water, and the reel is positioned adjacent the stern of the vessel, the straightening rollers are positioned in line with the natural, substantially straight line direction of the pipeline between the reel and the body of water, for the particular tensile load maintained in the pipeline as determined by the forward movement of the vessel and rotational speed of the reel.

By mounting the reel on the vessel for rotation about a substantially horizontal axis, and reverse bending the pipeline as it leaves the reel in a substantially vertical plane to remove any permanent curvature placed in the pipe when it was wound on the reel, any residual curvature left in the pipeline as a result of under or over reverse bending thereof, will tend to cause the pipe to bow in a vertical position which will be resisted by the weight of the pipe. Since a large percentage of underwater pipelines are buried by devices that move along the pipelines and are guided thereby, small humps and dips in the vertical plane are much less a problem than curves or deformation in a horizontal plane which would require the burying devices to more laterally to the desired direction of travel.

As another feature of the present invention, the straightening rollers are movable horizontally and substantially parallel to the axis of rotation of the reel for the purpose of minimizing the lateral curvature of the pipeline between the reel and the straightening rollers such that the yield point of the pipeline is not exceeded. Preferably, the straightening rollers are positioned so that the pipeline can be unwound from the reel from either the top or the bottom thereof, with substantially the same curvature of the pipeline between the reel and the straightening rollers.

BRIEF DESCRIPTION OF THE DRAWINGS

FIG. 3 is an enlarged side elevational view of the pipe straightening apparatus shown in FIG. 1;

FIG. 4 is a plan view taken substantially along line 4—4 of FIG. 3;

FIG. 5 is a partial sectional view taken substantially along line 5—5 in FIG. 3; and FIG. 6 is a side elevational view of the apparatus of the present invention as positioned on a floating vessel for laying pipeline on the floor of a deep body of water.

DESCRIPTION OF THE PREFERRED EMBODIMENT

The apparatus and method of the present invention have utility for laying a pipeline on any terrain where it is advantageous to join pipe sections together to form a continuous pipeline at some location remote from where the pipeline is to be laid. The apparatus and method of this invention have particular utility in connection with the laying of a pipeline on the floor of a body of water.

Figure 1:
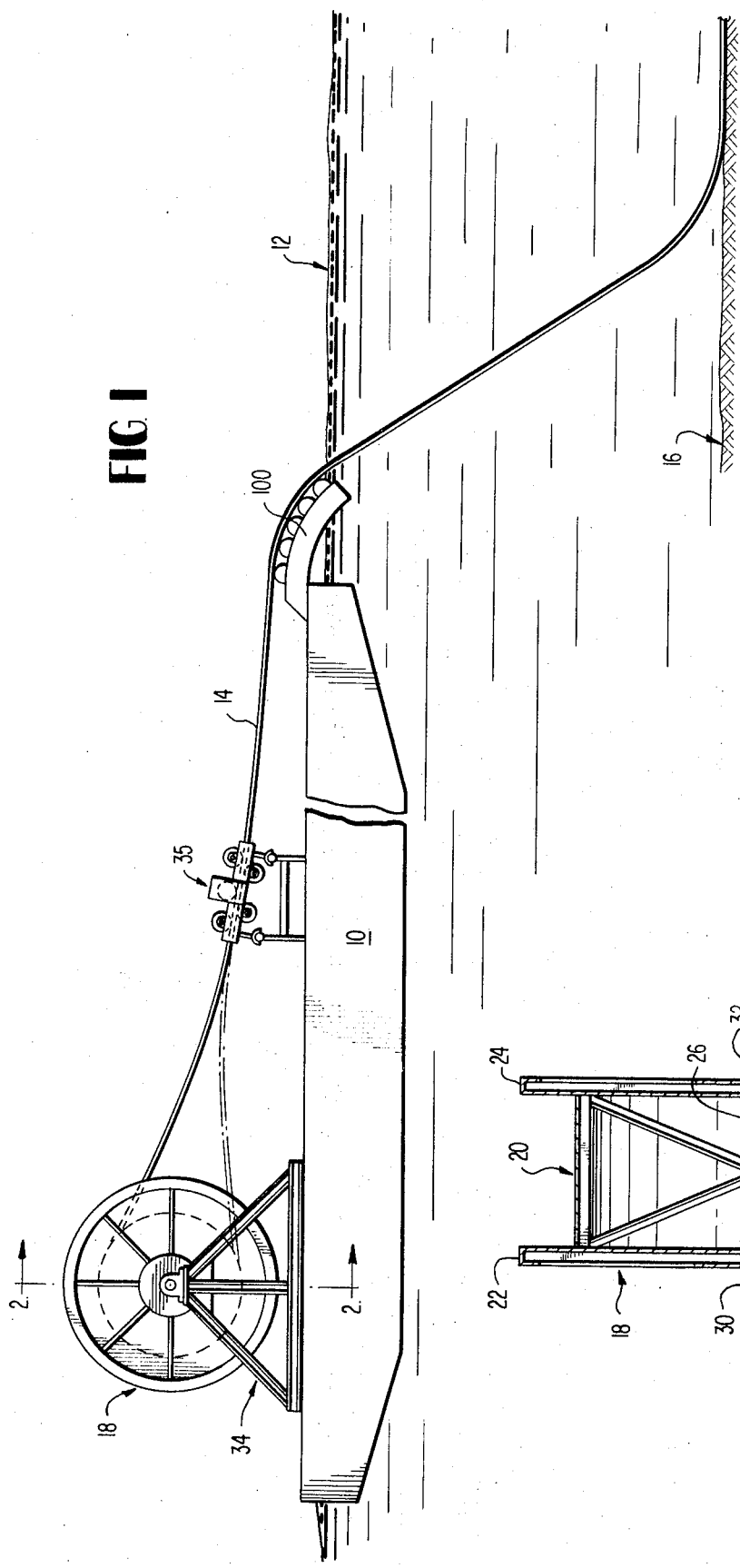
FIG. 1 is a side elevational view of the apparatus of the present invention supported on a floating vessel for laying pipeline along the floor of a body of water.

In FIG. 1, the apparatus of this invention is shown supported by a vessel, such as a barge 10, that is floating in a body of water, the surface of which is indicated by the numeral 12. The apparatus is shown laying a continuous pipeline 14 along the floor 16 of the body of water as the barge 10 moves in the desired direction of the pipeline (to the left as viewed in FIG. 1).

Before the laying operation begins, the pipeline 14, which is made up of a plurality of sections of pipe welded or otherwise secured together, is wound on a reel 18. Usually, the connecting of the pipe sections and the winding of the pipe on the reel 18 is effected on a protected area on shore. Since a reel of a given physical size can only hold a certain length of continuous pipeline of a given diameter, several reels of pipeline may be required to complete the laying of one pipeline on the floor of a body of water. Accordingly, it is to be understood that the terms "pipeline" and "pipe", as used herein, refer to a section of continuous pipeline that is wound on the particular reel in question.

Figure 2:
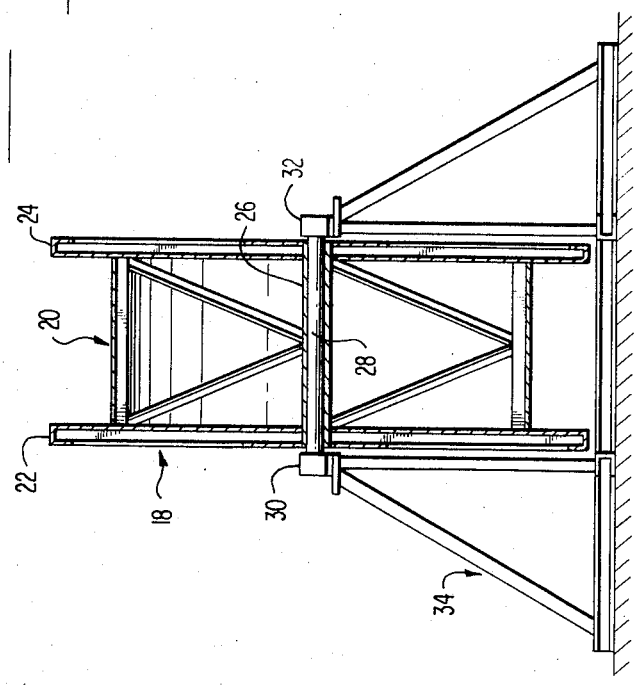
FIG. 2 is an enlarged sectional view taken from substantially along line 2—2 of FIG. 1.

As best seen in FIG. 2, reel 18 includes cylindrical drum section 20 and end flanges 22 and 24. The end flanges 22 and 24 are greater in diameter than the drum section 20, so that the pipe may be wound on the drum section between the flanges which prevent the pipe from slipping over the side of the drum. Usually, several layers of pipeline can be wound on the reel before the diameter of the wound pipeline reaches the outer diameter of the end flanges. The drum section 20 and end flanges 22 and 24 are connected together and to a central tubular member 26 in any suitable manner. The longitudinal axis of the central tubular member 26 coincides with the longitudinal axes of the drum section and end flanges. A shaft 28 extends through tubular member 26 and rotatably supports the reel 18 on any suitable type of bearing assemblies (not shown) located in housings 30 and 32. The bearing housings 30 and 32 are supported by a frame or base 34.

It will be readily seen, therefore, that reel 18 is mounted on frame or base 34 and barge 10 for rotation about a substantially horizontal axis, that is, the longitudinal axis of the shaft 28. Power means (not shown) of any suitable type are provided to rotate the reel at any desired speed to effect unwinding of the pipeline from the reel or winding of the pipeline onto the reel, and to maintain the desired tension in the pipe in conjunction with the speed of forward movement of the barge 10. As an illustrative example, hydraulic motors (not shown) with sprockets engaging roller chains on the end flanges of the reel may be used for this purpose.

As shown in FIGS. 1 and 2, the frame or base 34 for the reel assembly 18 is movable in any suitable manner along the deck of the barge between the bow and the stern thereof. As an illustrative example, the frame or base 34 may be provided with or supported on one or more skids or rollers for the purpose of facilitating movement of the reel assembly along the deck of the barge 10. It will be appreciated, therefore, that the reel assembly is a portable-type assembly so as to facilitate movement thereof on any support surface, such as the deck of the barge 10. As will be discussed further hereinafter, the reel assembly may be positioned on the barge 10 for the laying of the pipeline 14 in a relatively shallow body of water (e.g., less than 500 ft. in depth), as shown in FIG. 1, and may be positioned adjacent the stern of the barge 102 for the laying of the pipeline 14 in a deep body of water, as shown in FIG. 6.

Referring to FIGS. 1 and 3 through 5, means are provided to reverse bend the pipeline 14 as it is unwound from the reel 18 to straighten the pipeline before it leaves the barge 10 and enters the water 12. With the reel 18 as described above, the pipeline is bent substantially in a vertical plane as it is wound onto the drum section 20. Therefore, a straightening assembly 35 is provided on the deck of the barge 10 between the reel 18 and the stern of the barge for reverse bending the pipeline in a substantially vertical plane in order to remove any permanent curvature or deformation therein caused by winding onto reel 18. In the embodiments shown, and as an illustrative example, the straightening assembly 35 may include fixed rotatable rollers 36, 38, 40 and 42, as best seen in FIGS. 3 and 4. These rollers are mounted on shafts 44 that extend between spaced, parallel support beams 46 and 48. The shafts 44 are supported for rotation by bearings 50. Support beams 46 and 48 are connected together by end plates 52 and 54 at the ends thereof. Guide rollers 56 and 58 are mounted for rotation between end plates 52 and 54 respectively, and act as lateral guides for the pipeline as it enters and leaves the straightening assembly 35.

The straightening assembly 35 includes means to vary the radius of curvature to which the pipeline 14 is bent in a vertical plane as it travels therethrough. In the embodiment shown, a roller 60 is supported by shaft 62, the opposite ends of which are supported by bearings 64 and 66 of any suitable type. These bearings are attached to U-shaped plates 68 and 70 respectively, that are movable vertically between flanges 72 and vertical beam 74 located on opposite sides of roller 60. Beams 74 are an integral part of support beams 46 and 48. Plate 76 extends between the two vertical beams 74 to support hydraulic cylinders 78 and 80, the rod ends of which are connected to the U-shaped plates 68 and 70 for moving the plates and roller 60 along the longitudinal axis of beam 74.

As shown in FIGS. 3 and 4, pipeline 14, as it is unwound from reel 18 passes between stationary rollers 36 and 38, and then it is engaged by movable roller 60 that causes it to be bent downwardly between roller 60 and stationary rollers 38 and 42. The pipeline leaves the straightening assembly between stationary rollers 40 and 42. The amount of reverse bend is determined by the position of movable roller 60 which can be adjusted, as required, by power cylinders 79 and 80 or by any other suitable power means.

In accordance with one aspect of this invention, the straightening assembly 35 preferably is positioned so that the pipeline can be unwound from reel 18 from either the top of the reel or the bottom of the reel, with the pipeline having substantially the same curvature between the reel and the straightening assembly. To accomplish this, the straightening assembly is positioned so that the movable roller 60 moves along a line that is substantially perpendicular to a line that intersects the axis of rotation of the reel 18. As shown in FIG. 1, this results in the same initial bend being imposed upon the pipeline between the reel and the straightening assembly, whether the pipe is unwound from the top of the reel or from the bottom of the reel, as indicated in solid and broken lines. This is a particularly advantageous feature where reels of pipeline are moved onto the barge for unwinding and then moved off for rewinding with pipeline, because it eliminates the need to constantly instruct the people handling the reels on how they are to be positioned on the movable frame or base 34. In addition, by inclining the line along which the movable roller 60 travels, as shown in FIG. 1, the straightening assembly 35 can be positioned as close to the deck of the barge 10 as desired.

The width of drum section 20 of the reel 18 should be sufficiently wide to allow a reasonable amount of pipeline to be wound thereon. The straightening assembly 35 should be positioned so that the lateral bend imposed on the pipeline to move from one side of the drum to a position in line with the straightening assembly does not result in a permanent lateral bend in the pipeline, i.e., does not exceed the yield point of the pipeline material. To avoid this, the straightening assembly 35 can be positioned far enough away from the reel such that sharp bends are not required, or the straightening assembly can be moved laterally to a sufficient extent to prevent such bending from occurring. The first alternative usually would require that there be a substantial distance between the straightening assembly and the drum, and would require too much desk surface to accommodate the apparatus. As a feature of the present invention, the straightening assembly 35 is movable laterally in a horizontal plane to allow it to be reasonably close to the reel 18, while minimizing the lateral curvature of the pipeline between the reel and the straightening assembly so as not to produce stresses above the yield point of the pipeline material.

In the embodiment shown, the straightening assembly 35 is supported by beams 82 and 83 that have curved shoes 84 and 85 attached to their lower ends. These curved shoes are designed to engage the curved surfaces of tubular rail members 86 and 87, respectively, so as to be slidable therealong. To move the straightening assembly 35, elongated shaft 88 is mounted on base beam 89 with sprockets 90 and 91 attached at opposite ends thereof. A roller chain 92 is in engagement with sprocket 90 and extends beneath the straightening means to encircle sprocket 93 similarly mounted on shaft 94 on the other side of the support base for the straightening means. One end of chain 92 is connected to support beam 46 and the other end is connected to support beam 48 so that rotation of sprocket 90 in one direction will move the support beams and their related equipment in one direction along rails 86 and 87, and rotation of sprocket 90 in the other direction will move the support beams and their related equipment in the opposite direction along rails 86 and 87. Sprocket 91 is provided with roller chain 95 which is arranged in the same manner with a similar sprocket (not shown) on the other end of shaft 94. A hydraulic motor 96 or other suitable power means supplies power to shaft 88 to rotate the sprockets and to move the straightening assembly laterally as required to receive the pipe being unwound from the reel.

For the purpose of maintaining a minimum radius of curvature in the pipeline as it leaves the barge and enters the water, a curved guide shoe 100 of any suitable type is mounted on the stern of the barge, as shown in FIG. 1, for the laying of pipeline in relatively shallow water.

As hereinbefore described, one of the significant features of this invention is to provide a method and apparatus for laying pipeline in any depth of water within the limits of the pipe to support itself between the point where it rests on the bottom and the surface of the water. When the pipeline is to be laid in deep water (for example, over 500 ft. in depth), the significant weight of pipe between the bottom and the barge exerts a substantial downward force on the pipeline at the point where the pipeline leaves the reel and enters the water. In conventional pipeline laying apparatus, the pipeline must be supported by curved guide shoe or other similar device as it leaves the barge deck to maintain a minimum radius of curvature in the pipe and prevent this downward force from exceeding the yield point of the pipeline material and permanently deforming the pipeline or breaking it at this point.

Referring specifically to FIG. 6, for deep water pipeline laying, the portable reel assembly of the present invention is positioned closely adjacent to the stern of the barge 10 so that the pipeline 14 leaving the reel 18 can be advanced into the water 12 in a substantially straight line without requiring the use of a curved side shoe or similar device. In this manner, deformation or undue curvature of the pipeline between the reel 18 and the surface of the water 12 is effectively prevented, without the use of the conventional guide shoe or similar device.

A straightening assembly 35', similar or identical to the straightening assembly 35 shown in FIGS. 1 and 3 through 5, is positioned on the deck of barge 10 just rearwardly of the reel assembly 18. The straightening assembly 35' is so positioned as to be in alignment with the substantially straight line direction of the pipeline from the reel 18 to the water 12. In this manner, the pipeline can be straightened to remove any curvature therein resulting from winding on the reel 18 before it enters the water, with substantially all of the weight of the pipeline, between the reel 18 and bottom 16, supported by the reel 18. With this positioning of the reel 18 and straightening assembly 35', the section of pipeline between the reel 18 and the bottom 16 can assume its natural catenary curve, and the only place the curvature of the pipeline could exceed its yield point is where it curves into alignment with the bottom 16. This bend, indicated by radius R, can be controlled by the amount of tension maintained in the pipeline as it is being laid so that the radius R is such that the yield point of the pipe will not be exceeded. Thus, by supporting the pipeline 14 at only two points, that is, the reel 18 and the bottom 16 of the body of water, the pipeline can be safely laid in any depth of water without subjecting the pipeline to bending stress such that it will be permanently deformed when it reaches the bottom of the body of water. This is accomplished by the portability of the reel assembly of the present invention, which enables it to be conveniently positioned anywhere along the deck of barge 10.

As many possible embodiments may be made of the apparatus and method of this invention without departing from the scope thereof, it is to be understood that all matters set forth herein or shown in the accompanying drawings is to be interpreted as illustrative and not in a limiting sense.

What is claimed is:

1. Apparatus for laying a pipeline on the floor of a body of water from a movable floating vessel, said apparatus comprising a reel assembly including a generally cylindrical real upon which a pipeline may be wound and means on the vessel supporting the reel for rotation around its longitudinal axis with said axis substantially horizontal to enable the pipeline to be unwound from said reel toward the stern of said vessel and into the body of water as the vessel moves forwardly, and for movement between the bow and stern of said vessel, whereby said reel can be moved adjacent to the stern of said vessel so that the pipeline can be unwound therefrom and advanced into the body of water in a substantially straight line until it nears the floor of the body of water, means for reverse bending the pipeline in a substantially vertical plane to remove curvature from said pipeline caused by winding on the reel, said reverse bending means being positioned on said vessel between said reel and the stern of said vessel, and including a movable roller and a fixed roller for reverse bending the pipeline as it is unwound from the reel, means mounting the movable roller for movement along a line that is substantially perpendicular to a line that intersects the axis of rotation of the reel, whereby the pipeline can be unwound from either the top or bottom of the reel with substantially the same curvature in the portion of the pipeline between the reel and the reverse bending means, and means for moving said reverse bending means horizontally to maintain the radius of curvature of the pipeline in a horizontal plane as it passes from the reel to the straightening means such that the stress imposed in the pipeline by such horizontal bending is below the yield point of the pipeline.

2. A method of laying a pipeline wound on a reel on the floor of a body of water, comprising the steps of:
   rotatably and movably supporting said reel on a floating vessel such that said reel is movable between the bow and stern of said vessel,
   positioning the reel adjacent the stern of said vessel, and
   unwinding the pipeline from said reel into the body of water in a substantially straight line as said vessel is moved forwardly.

3. The method of claim 2 comprising the additional step of reverse bending the pipeline to remove curvature therein caused by winding on the reel as the pipeline is unwound from the reel and before it enters the body of water.

4. The method of claim 3 wherein said reverse bending means is positioned in alignment with the substantially straight line of the pipeline from the reel into the body of water.

5. The method of claim 3 wherein said reel is rotatably mounted on said vessel for rotation about the substantially horizontal axis, and comprising the additional step of moving said reverse bending means horizontally in substantially parallel relation to the axis of rotation of said reel to maintain a radius of curvature of the pipeline in a horizontal plane as it passes from the reel to the reverse bending means such that the stress imposed in the pipeline by such horizontal bending is below the yield point of the pipeline.

6. Apparatus for laying a pipeline on the bottom of a body of water comprising a generally cylindrical reel having said pipeline wound thereon, means supporting the reel for rotation around its longitudinal axis as the pipeline is pulled from the reel and moved into the water, and means for bending the pipeline in the opposite direction from the direction it was bent when wound on the reel to remove the curvature placed in the pipeline when wound on the reel, said straightening means including a movable roller and a fixed roller and means mounting the movable roller for movement along a line perpendicular to a line that intersects the axis of rotation of the reel to allow the pipeline to be unwound from the reel from either side of the reel with substantially the same curvature between the reel and the straightening means.

* * * * *